United States Patent
McLean

(10) Patent No.: US 6,872,287 B1
(45) Date of Patent: Mar. 29, 2005

(54) ELECTROCHEMICAL CELL

(75) Inventor: Gerard Francis McLean, West Vancouver (CA)

(73) Assignee: Angstrom Power (CA)

( * ) Notice: Subject to any disclaimer, the term of this patent is extended or adjusted under 35 U.S.C. 154(b) by 262 days.

(21) Appl. No.: 10/349,338

(22) Filed: Jan. 22, 2003

Related U.S. Application Data

(60) Provisional application No. 60/354,637, filed on Feb. 6, 2002.

(51) Int. Cl.$^7$ ............................. C25B 9/00; C25C 7/00; H01M 2/08; H01M 2/14
(52) U.S. Cl. ...................... 204/265; 204/266; 204/295; 204/296; 429/36; 429/38
(58) Field of Search ............................... 204/263, 265, 204/266, 295, 296; 429/36, 38

(56) References Cited

U.S. PATENT DOCUMENTS

| | | | |
|---|---|---|---|
| 5,316,643 A | * | 5/1994 | Ahn et al. ................ 204/265 |
| 5,631,099 A | | 5/1997 | Hockaday .................... 429/30 |
| 5,759,712 A | | 6/1998 | Hockaday .................... 429/30 |
| 5,861,221 A | | 1/1999 | Ledjeff ........................ 429/32 |
| 5,925,477 A | | 7/1999 | Ledjeff ........................ 429/32 |
| 6,024,848 A | * | 2/2000 | Dufner et al. .............. 204/252 |
| 6,060,188 A | | 5/2000 | Muthuswamy ................ 429/31 |
| 6,127,058 A | | 10/2000 | Pratt ........................... 429/30 |
| 6,312,846 B1 | | 11/2001 | Marsh ......................... 429/30 |

FOREIGN PATENT DOCUMENTS

| | | | |
|---|---|---|---|
| GB | 2339058 | 1/2000 | ............ H01M/8/00 |
| JP | 8050903 | 2/1996 | |
| WO | WO 01/95406 | 12/2001 | |

* cited by examiner

*Primary Examiner*—Donald R. Valentine
(74) *Attorney, Agent, or Firm*—Buskop Law Group, P.C.; Wendy Buskop

(57) ABSTRACT

The invention is an electrochemical cell for the separation of hydrogen and oxygen from water made of a fuel plenum with a fuel inlet, a oxidant plenum, a porous substrate, an undulating channel with walls, a support member between the walls, an anode and a cathode in the walls, an electrolyte contacting the anode and the cathode forming a barrier preventing transfer of fuel and oxidant to the cathode or to the anode, a two separate coatings on the porous substrate to prevent fuel or oxidant from entering the porous substrate, a sealant barrier to divide the two plenums, and a negative electrical and a positive electrical connection on the side of the porous substrate for flowing current from an outside source to the porous substrate.

34 Claims, 18 Drawing Sheets

US 6,872,287 B1

ELECTROCHEMICAL CELL

The application herein claims priority from the provisional Patent Application 60/354,637 with a filing date of Feb. 6, 2002.

FIELD OF THE INVENTION

The present invention relates to a method for making fuel cells. More specifically a method for making a fuel cell layer comprising multiple cells using distinct channels formed in a single porous substrate.

BACKGROUND OF THE INVENTION

Existing fuel cells generally are a stacked assembly of individual fuel cells, with each stack producing high current at low voltage. The typical cell construction involves reactant distribution and current collection devices brought into contact with a layered electrochemical assembly consisting of a gas diffusion layer, a first catalyst layer, an electrolyte layer, a second catalyst layer and a second gas diffusion layer. With the exception of high temperature fuel cells, such as molten carbonate cells, most proton exchange membrane, direct methanol, solid oxide or alkaline fuel cells have a layered planar structure where the layers are first formed as distinct components and then assembled into a functional fuel cell stack by placing the layers in contact with each other.

One major problem with the layered planar structure fuel cell has been that the layers must be held in intimate electrical contact with each other, which if intimate contact does not occur the internal resistance of the stack increases, which decreases the overall efficiency of the fuel cell.

A second problem with the layered planar structured fuel cell has been that with larger surface areas, problems occur to maintain consistent contact with both cooling and water removal in the inner recesses of the layered planar structured fuel cell. Also if the overall area of the cell becomes too large then there are difficulties creating the contacting forces needed to maintain the correct fluid flow distribution of reactant gases over the electrolyte surface.

Existing devices also have the feature that with the layered planar structure fuel cell since both fuel and oxidant are required to flow within the plane of the layered planar structured fuel cell, at least 4 and up to 6 distinct layers have been required to form a workable cell, typically a first flowfield, a first gas diffusion layer, a first catalyst layer, a first electrolyte layer, a second catalyst layer, a second gas diffusion layer, a second flowfield layer and a separator. These layers are usually manufactured into two separate fuel cell components and then a fuel cell stack is formed by bringing layers into contact with each other. When contacting the layers care must be taken to allow gas diffusion within the layers while preventing gas leaking from the assembled fuel cell stack. Furthermore, all electrical current produced by the fuel cells in the stack must pass through each layer in the stack, relying on the simple contacting of distinct layers to provide an electrically conductive path. As a result, both sealing and conductivity require the assembled stack to be clamped together with significant force in order to activate perimeter seals and reduce internal contact resistance.

A need has existed for a micro, or small fuel cell having high volumetric power density.

A need has existed for a micro fuel cell capable of low cost manufacturing because of having fewer parts than the layered planar structure fuel cell.

A need has existed for a micro fuel cell having the ability to utilize a wide variety of electrolytes.

A need has existed for a micro fuel cell, which has substantially reduced contact resistance within the fuel cell.

A need has existed to develop fuel cell topologies or fuel cell architectures that allow increased active areas to be included in the same volume, i.e. higher density of active areas. This will allow fuel cells to be optimized in a manner different than being pursued by most fuel cell developers today.

SUMMARY OF THE INVENTION

The present invention contemplates an electrochemical cell for the separation of hydrogen and oxygen from water. The electrochemical cell has a fuel plenum with a fuel inlet, a oxidant plenum, a porous substrate, an undulating channel with walls, a support member between the walls, an anode and a cathode in the walls, an electrolyte contacting the anode and the cathode forming a barrier preventing transfer of fuel and oxidant to the cathode or to the anode. The invention also has two separate coatings on the porous substrate to prevent fuel or oxidant from entering the porous substrate, a sealant barrier to divide the two plenums, and a negative electrical and a positive electrical connection on the side of the porous substrate for flowing current from an outside source to the porous substrate.

BRIEF DESCRIPTION OF THE FIGURES

A specific embodiment of the invention will be described by way of example with reference to the accompanying drawings, in which.

DETAILED DESCRIPTION OF INVENTION

Figure 1:
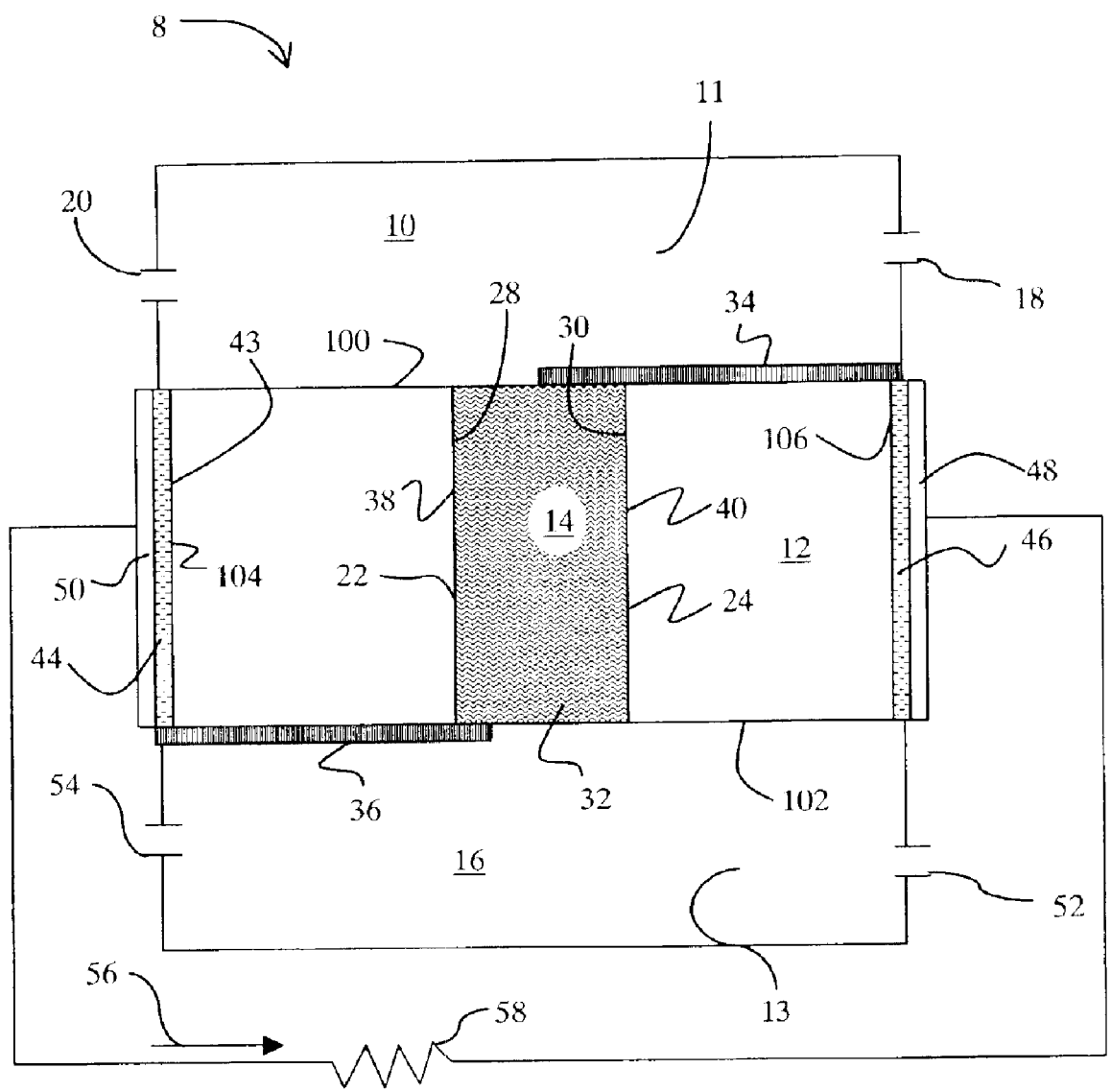
FIG. 1 is a cross-sectional view of a first embodiment of the inventive fuel cell.
Figure 1A:
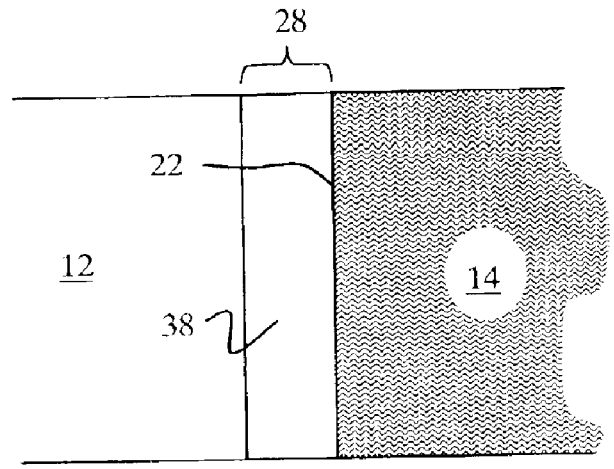
Figure 1B:
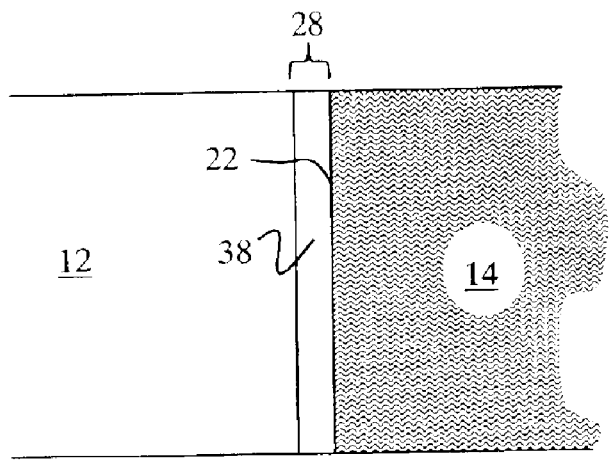
Figure 1C:
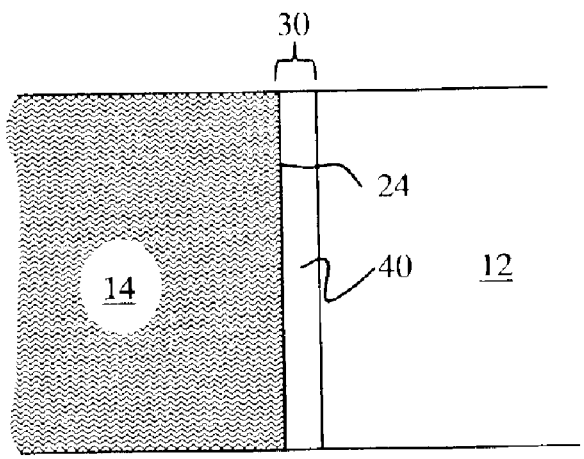

The present invention relates to a microstructure fuel cell having a single substrate, which is preferably porous, an assembly of fuel cells having a multiple substrate structure, and a system, which includes the novel fuel cell design and the mounting of an electronic device, such as a cellular phone, or possibly a flashlight on said fuel cell for operation.

The invention relates to a specific fuel cell architecture that is of an integrated design in which the functions of gas diffusion layers, catalyst layers, and electrolyte layers are integrated into a single substrate. This architecture makes it possible to fold together the various 'layers' of which a working fuel cell is formed and produce linear, curvilinear, undulating or even fractal shaped electrolyte paths that allow for higher volumetric power density to be achieved. In addition, by forming the various fuel cell layers within a single substrate the problem of simple contacting of fuel cell components to create electrical connections is eliminated, thus creating the potential for lower internal cell resistances to be achieved.

Unlike existing fuel cell designs, the present invention, in one embodiment, provides convoluted electrolyte layers, which do not smoothly undulate. Other embodiments of the invention include shapes which are essentially non-smooth. Utilizing such non-smooth electrolyte paths allows for greater overall surface areas for the fuel cell reactions to be packed into a given volume than can be achieved when planar electrolyte layers are employed as in conventional fuel cell designs.

The present invention contemplates the use of a design which was inspired by fractal designs, which provides long electrolyte path lengths. The invention includes a method for building fuel cells and "stacks" that are not dependent on the layered process and which do not require the post-manufacturing assembly of distinct layered components. The invention also contemplates a design which has the fuel cell layers turned on their side relative to the overall footprint of the assembled fuel cell device. The invention contemplates building multiple fuel cells with an integrated structure on a single substrate using parallel manufacturing methods.

Specifically, it is contemplated to use a porous substrate for the fuel cell through which reactant gas will diffuse with little driving force. The substrate may or may not be electrically conductive. If it is conductive, it is contemplated to insulate at least a portion of the substrate, which typically would separate the anode from the cathode, this insulation may be formed by the electrolyte separating anode from cathode and if necessary an insulating structural member may be added. More specifically, the fuel cell is contemplated to have: (a) a fuel plenum containing fuel molecules and a fuel plenum inlet for filling the fuel plenum with fuel molecules; (b) an oxidant plenum containing oxygen molecules; (c) a porous substrate communicating with the fuel plenum, and the oxidant plenum further comprises a top, a bottom, a first side and a second side; (d) an undulating channel formed in the porous substrate having a first channel wall, a second channel wall; (e) a support member disposed between the first channel wall and the second channel wall; (f) an anode formed from a first catalyst layer disposed on the first channel wall; (g) a cathode formed from a second catalyst layer disposed on the second channel wall; (h) electrolyte disposed in the undulating channel contacting the anode and the cathode forming a barrier preventing transfer of fuel molecules to the anode or cathode and preventing transfer of oxygen molecules to the anode or cathode; (i) a first coating disposed on at least a portion of the porous substrate to prevent fuel molecules from entering the porous substrate; (j) a second coating disposed on at least a portion of the porous substrate for preventing oxygen molecules from entering the porous substrate; (k) wherein the fuel plenum and the oxidant plenum are separated by the porous substrate and the electrolyte, such that fuel molecules are blocked from the cathodes and oxygen molecules are blocked from the anode by the electrolyte; (l) a sealant barrier disposed on the porous substrate between the fuel plenum and the oxidant plenum opposite the anode and the cathode; (m) a negative electrical connection disposed on the second side of the porous substrate for flowing current from the fuel cell to an outside source and a positive electrical connection disposed on the first side of the porous substrate for flowing current from the outside source to the porous substrate.

Referring to FIG. 1, which is a cross-sectional view of one embodiment of the invention, fuel cell 8 has a fuel plenum 10 containing fuel molecules 11. A porous substrate 12 is adjacent the fuel plenum 10. The fuel plenum can have a fuel plenum inlet 18. The fuel plenum can also have a fuel plenum outlet 20. An oxidant plenum 16 containing oxygen molecules 13 is adjacent the porous substrate 12.

The porous substrate 12 has an undulating channel 14. The undulating channel 14 has a first channel wall 22 and a second channel wall 24. A support member 26 separates first channel wall 22 from second channel wall 24. Additionally the porous substrate 12 has a top 100, bottom, 102, first side, 104 and a second side 106.

An anode 28 is created on the surface of the first channel wall 22, although the anode could be embedded in the wall as well. Anode 28 is created using a first catalyst layer 38 on the surface of the first channel wall 22.

A cathode 30 is formed on the surface of the second channel wall 24. Like the anode 28, the cathode 30 could be embedded in the second channel wall 24. Cathode 30 is created using a second catalyst layer 40.

An electrolyte 32 is disposed in the undulating channel 14.

A first coating 34 is disposed on a portion of the porous substrate 12 providing a layer between the porous substrate 12 and the fuel plenum 10. A second coating 36 is disposed on the porous substrate 12 providing a layer between the porous substrate and the oxidant plenum 16.

A sealant barrier 44 can either be directly disposed on the porous coating or formed in a sealant barrier channel 43 on the porous substrate 12. An optional second sealant barrier 46 can be used in some of the fuel cell designs.

A negative electrical connection 48 is engaged with the porous substrate 12 on the anode side of the porous substrate 12.

A positive electrical connection 50 is engaged with the porous substrate 12 on the cathode side of the porous substrate 12.

The oxidant plenum 16 can have an oxidant plenum inlet 52 and an oxidant plenum outlet 54.

Figure 2:
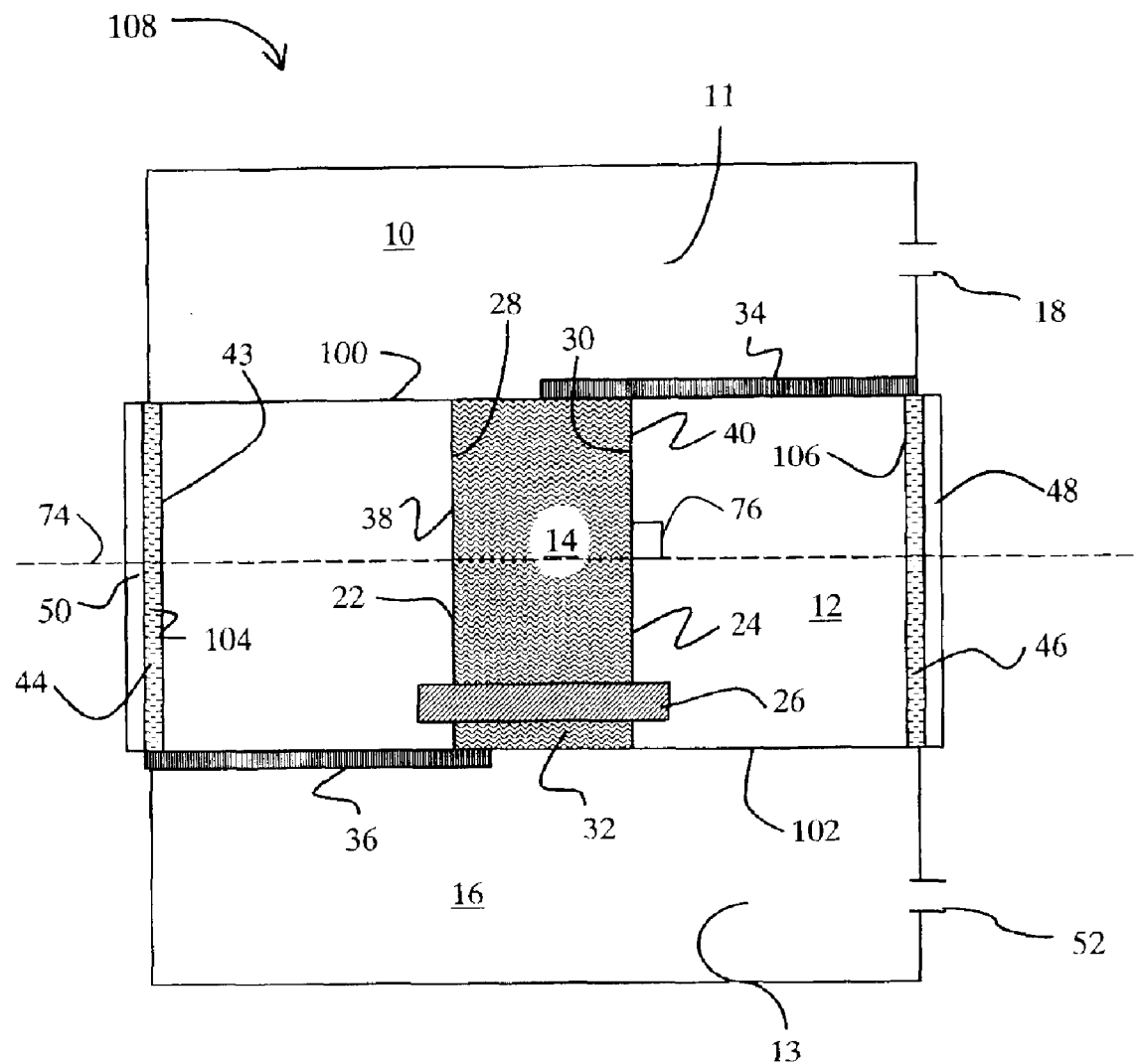
FIG. 2 is a cross-sectional view of a dead ended embodiment of the inventive fuel cell.
Figure 2A:
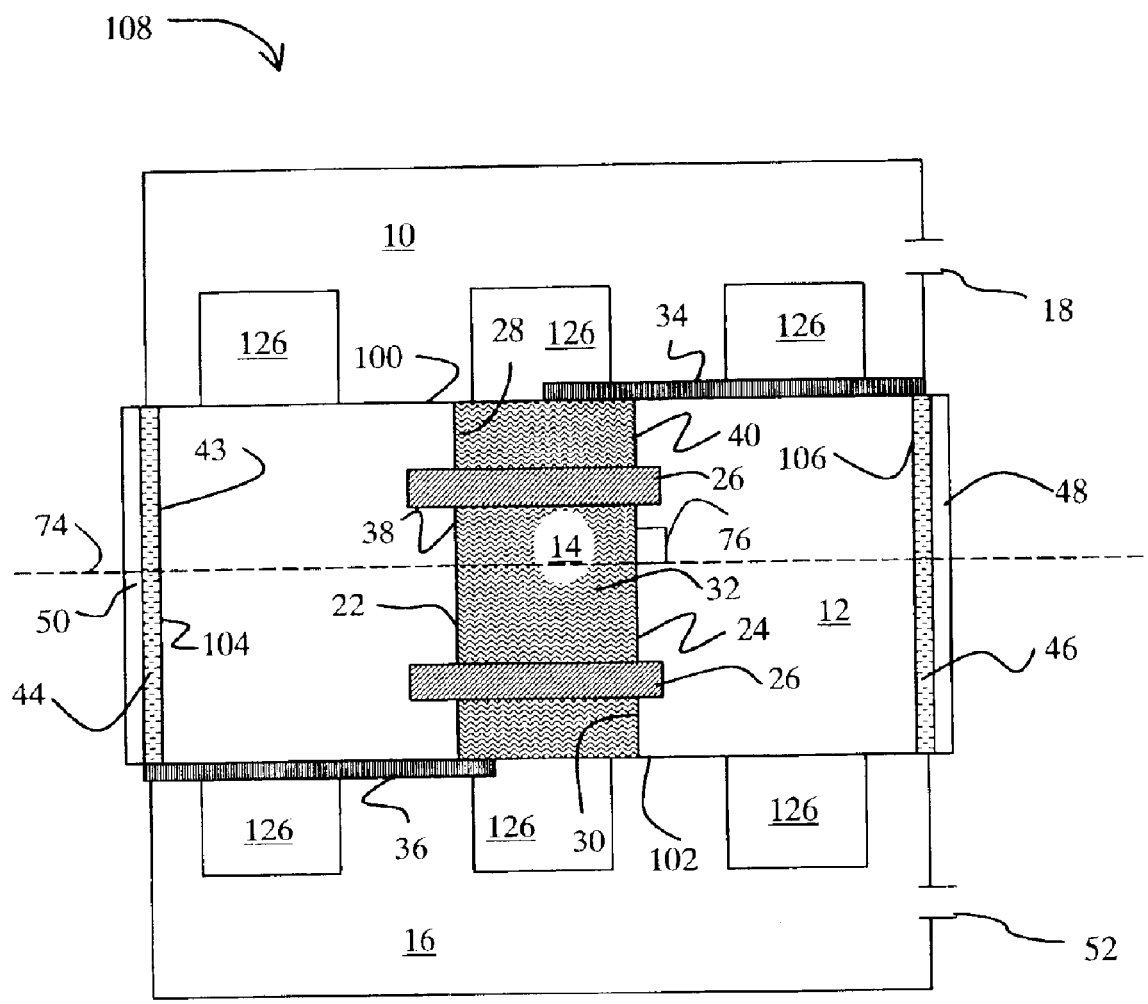

FIG. 2 is another embodiment of the invention showing a dead ended version of the fuel cell specifically excluding the fuel outlet 20 and the oxidant outlet 54 of the FIG. 1 embodiment.

Figure 3:
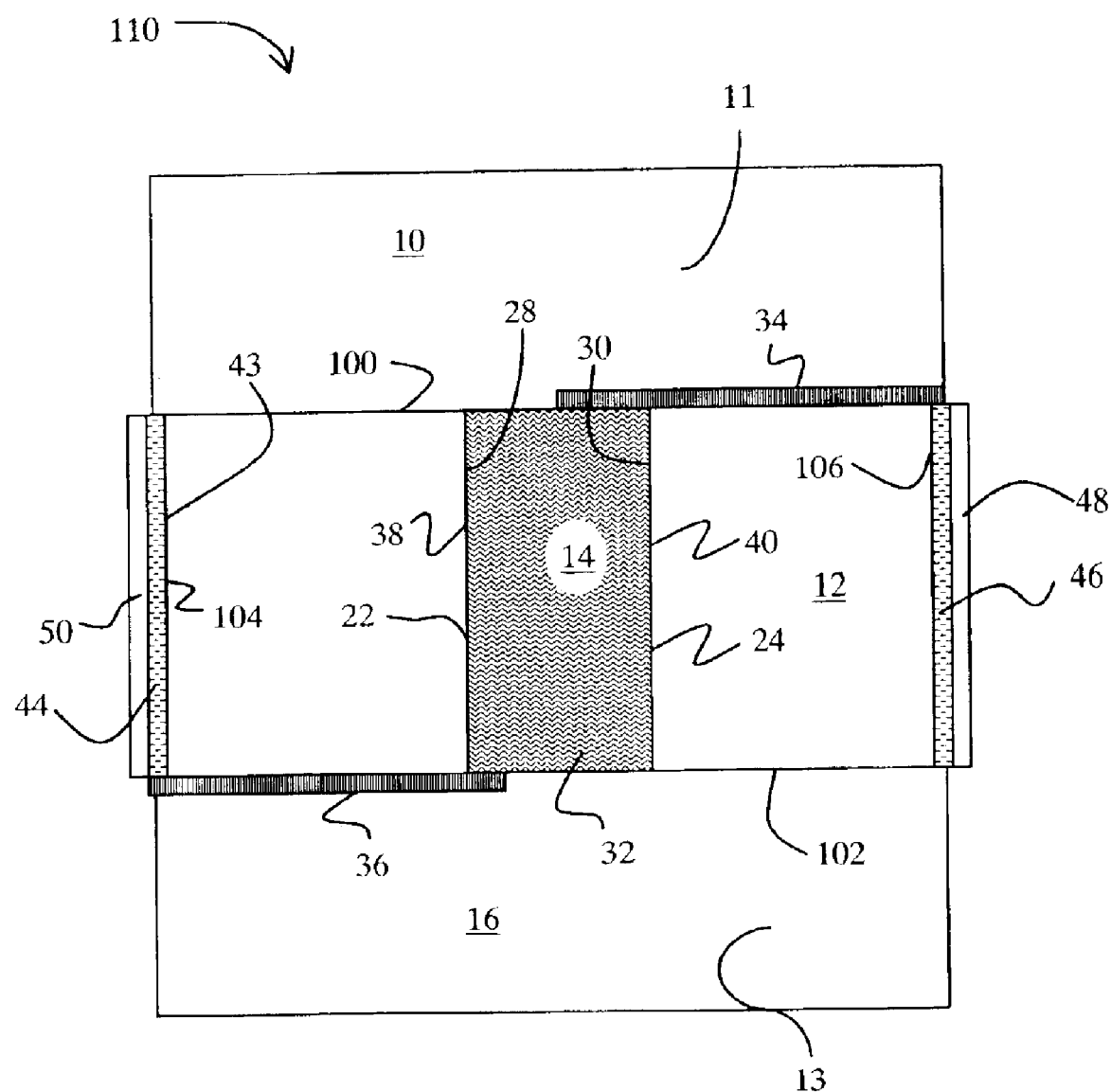
FIG. 3 is a cross-sectional view of another embodiment of a dead ended fuel cell.
Figure 3A:
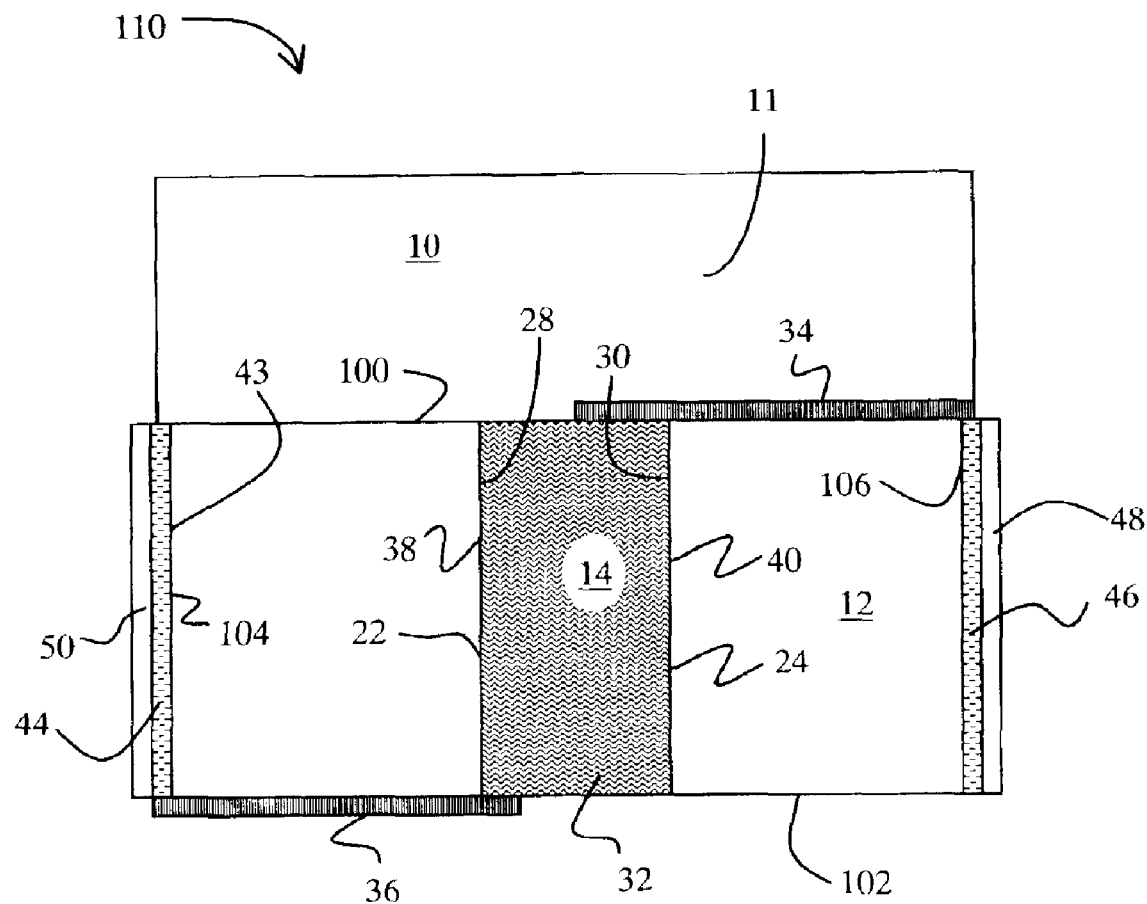
Figure 3B:
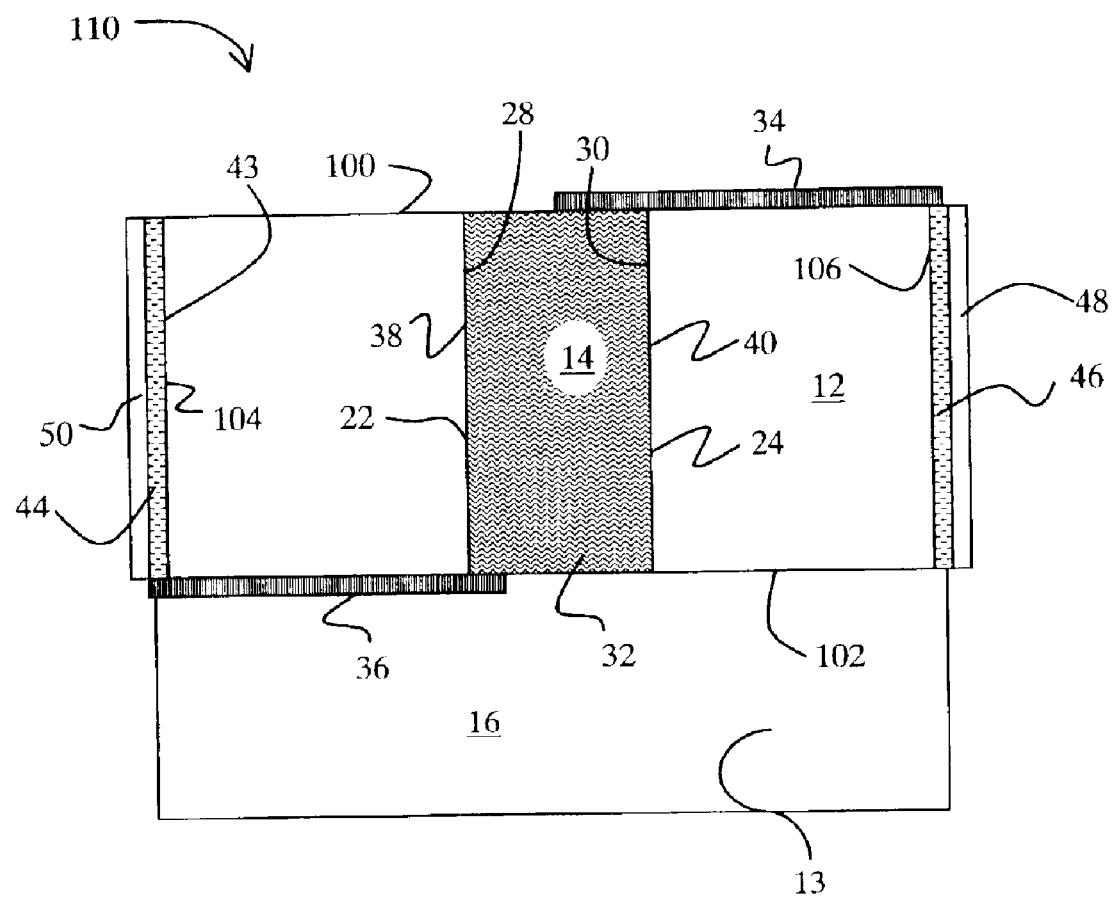

FIG. 3 is a cross section of another dead ended version of the fuel cell which excludes the fuel inlet 18 and oxidant inlet 52 of the embodiment of FIG. 1.

Figure 4:
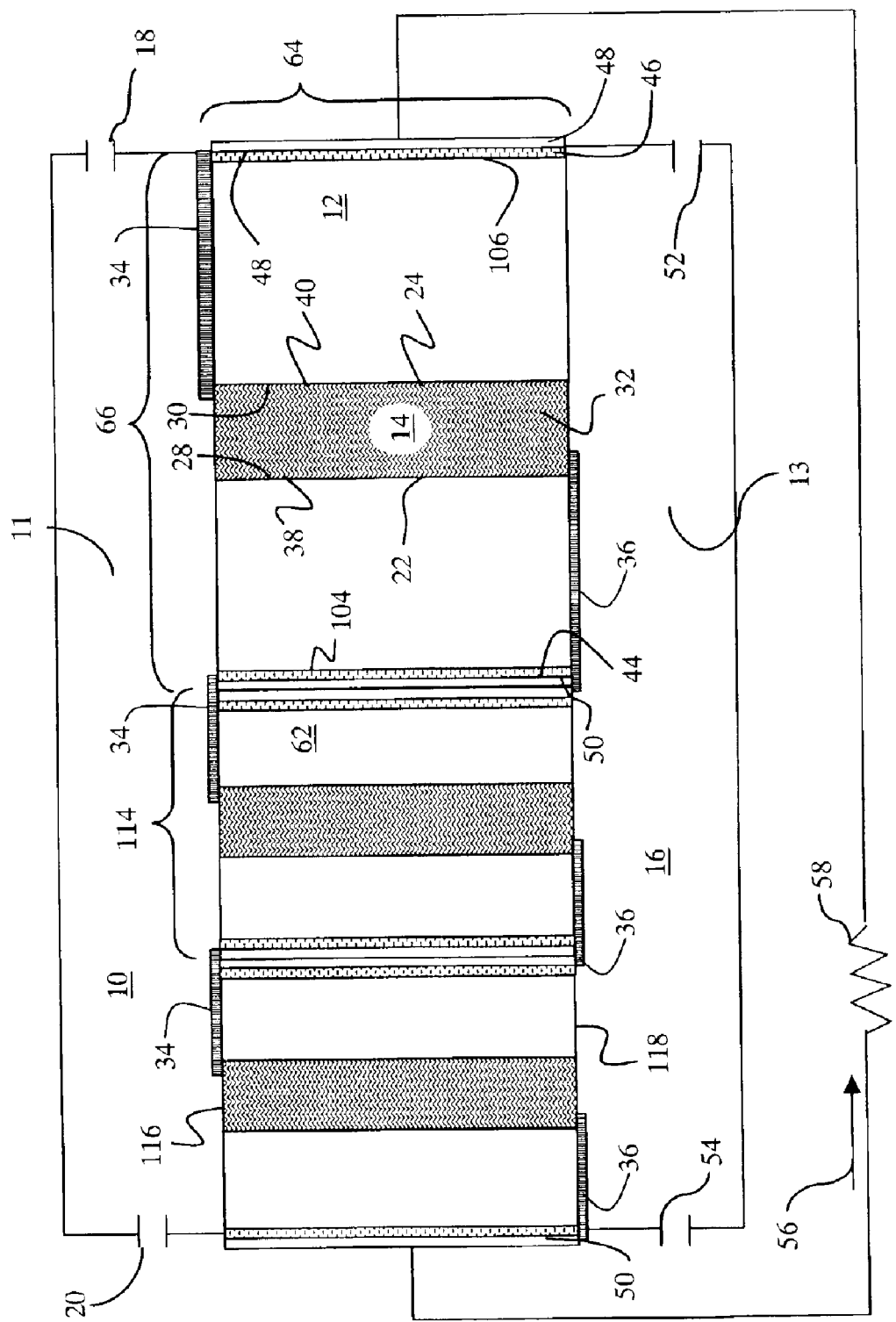
FIG. 4 is a cross-sectional view of a fuel cell layer formed by combining multiple fuel cells of the type described in FIG. 1.
Figure 4A:
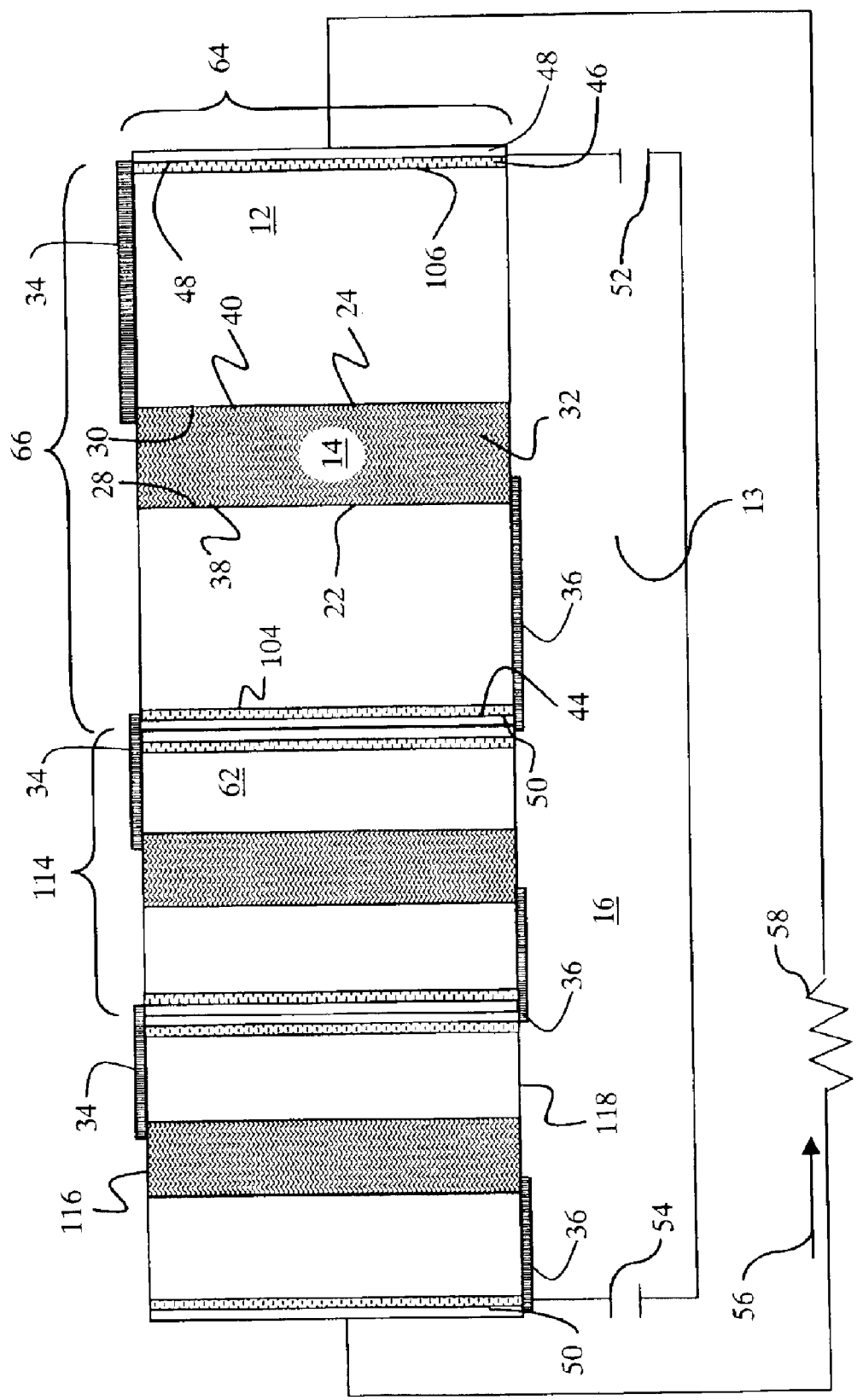
Figure 4B:
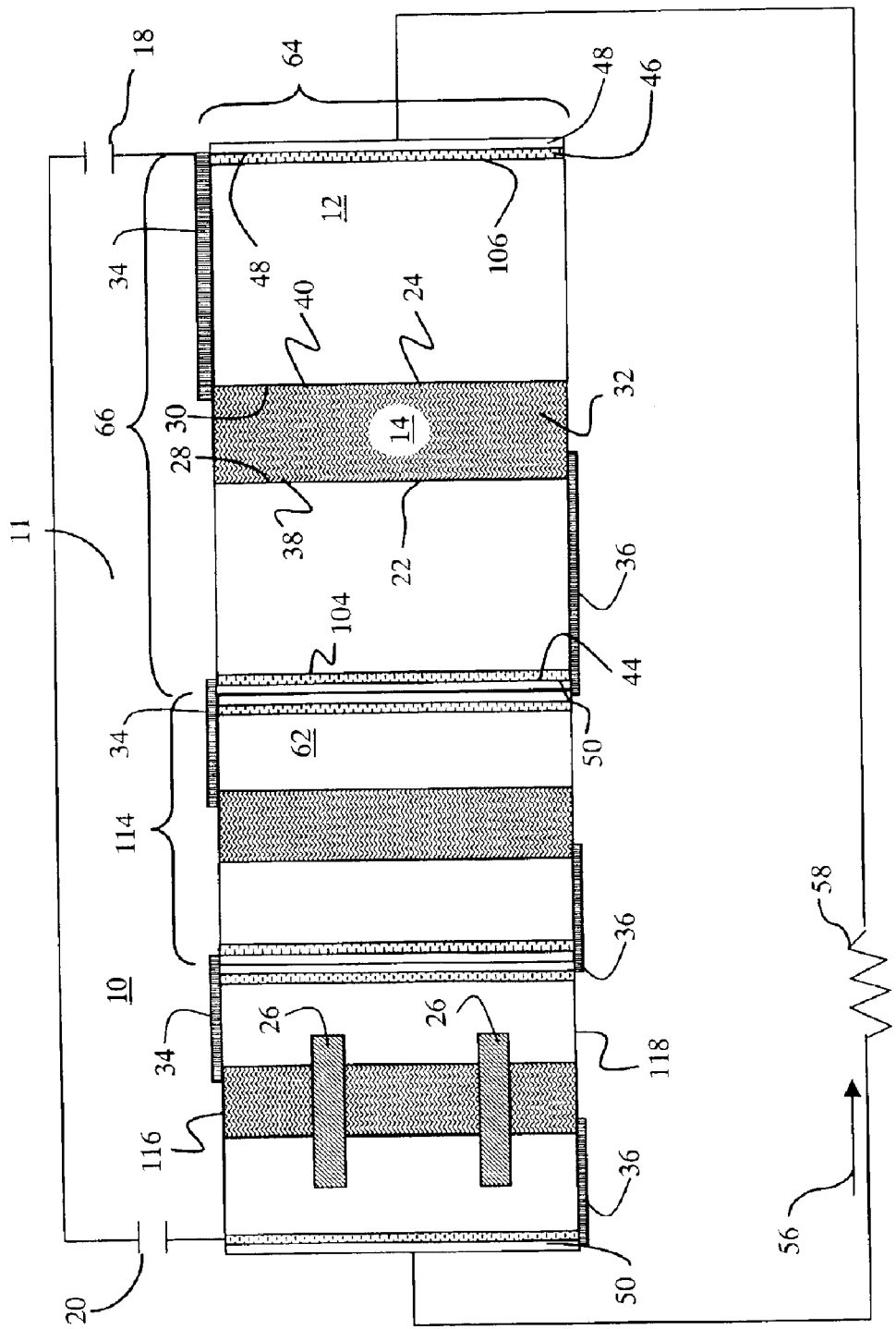
Figure 4C:
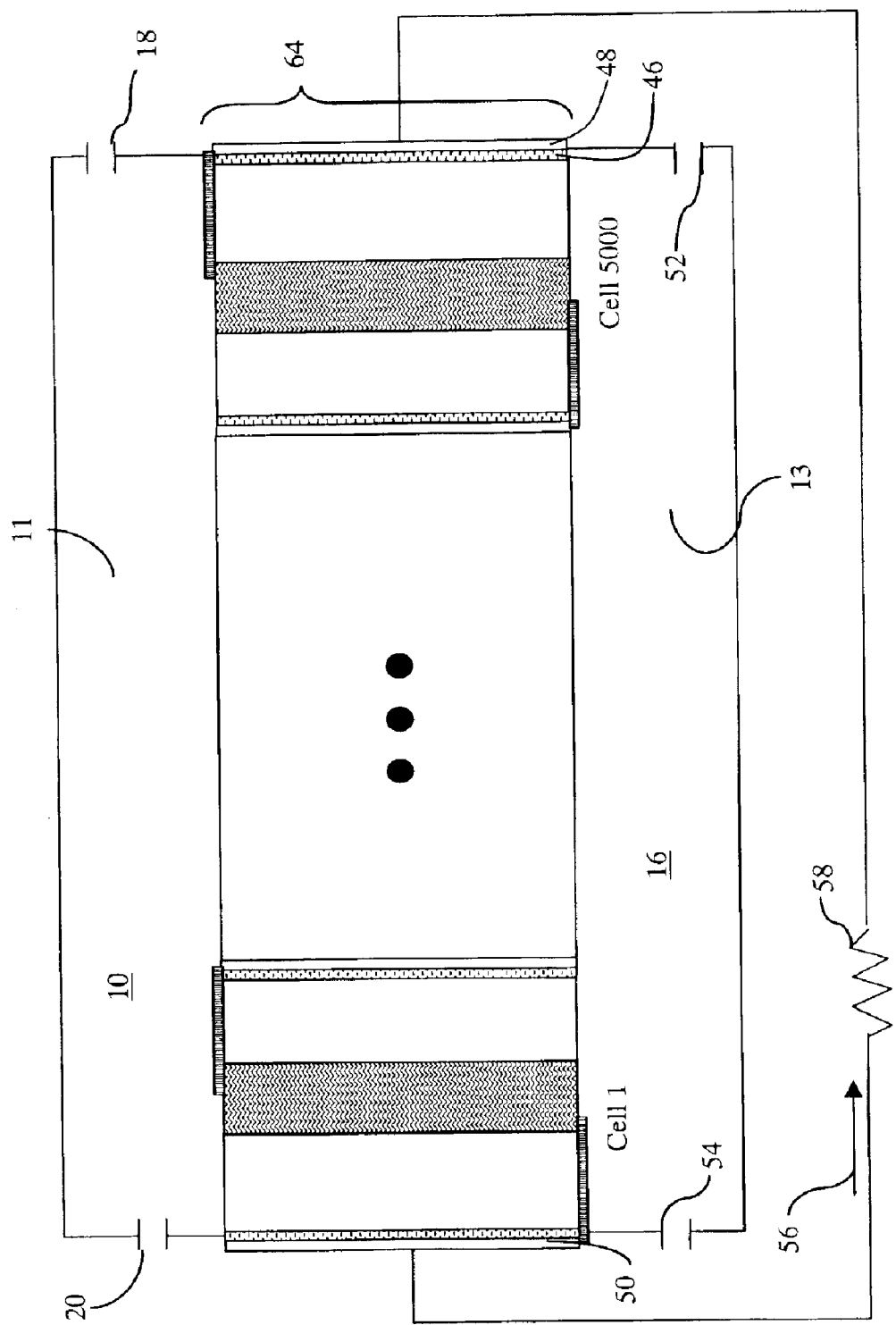
Figure 5:
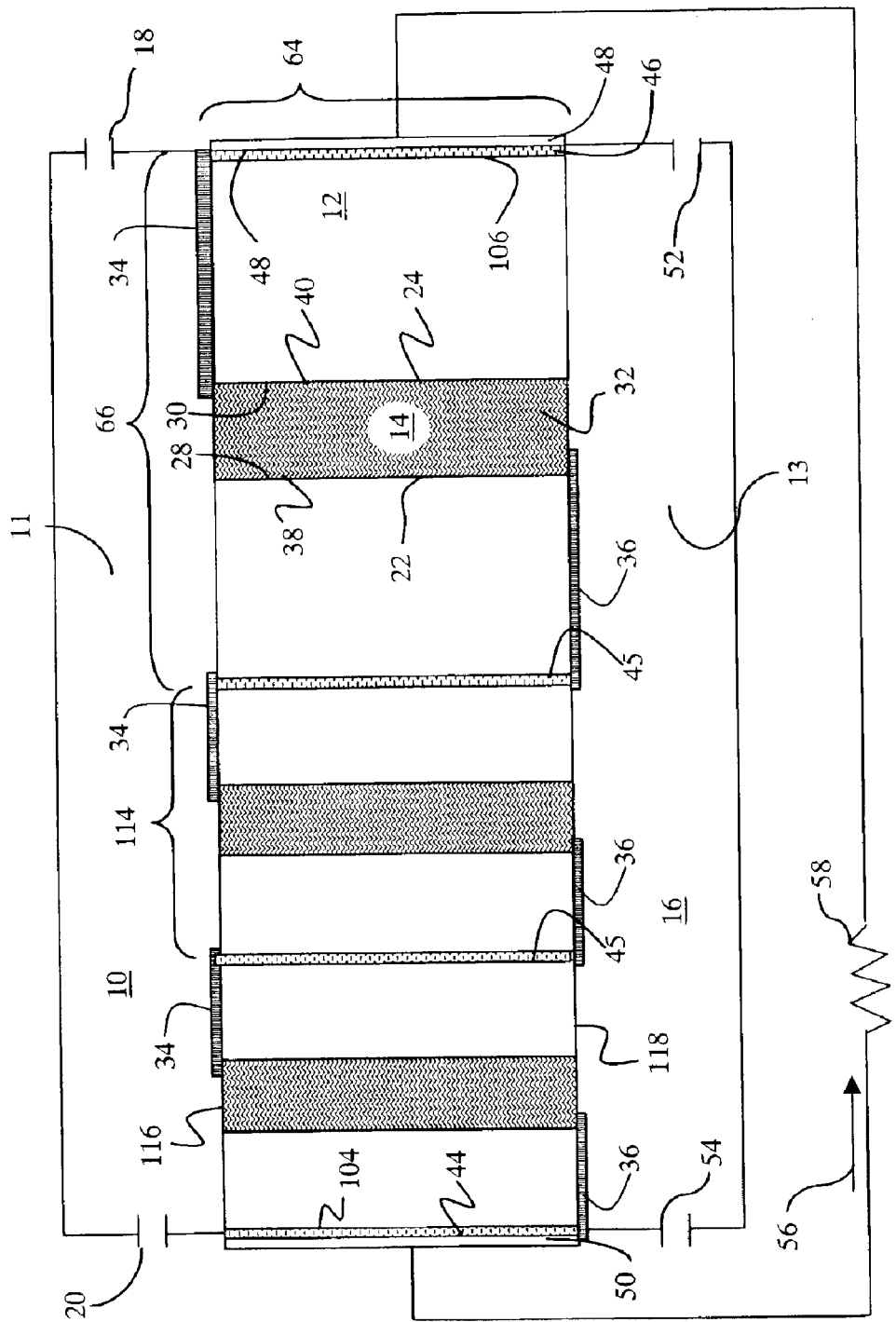
FIG. 5 is a cross-sectional view of a fuel cell with multiple fuel cells formed within a single substrate.
Figure 5A:
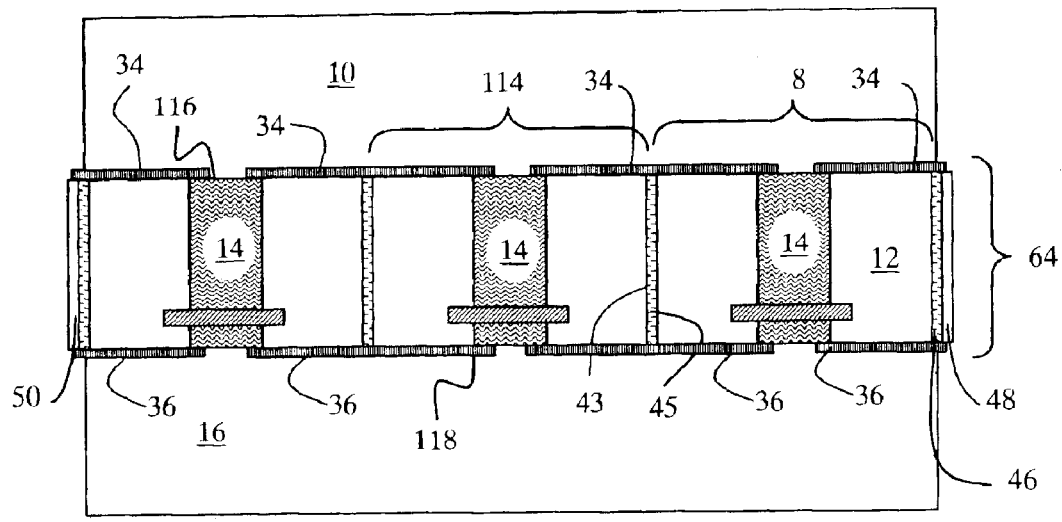

FIGS. 4 and 5 are cross-section views of the fuel cell of FIG. 1 showing an association of multiple fuel cells on one substrate to form a fuel cell layer.

FIG. 4 shows fuel cell 8 is formed from a substrate 12 which is made adjacent a second fuel cell 114 formed from a second substrate 62. The first and second fuel cells may be formed from either the association of multiple substrates or, as shown in FIG. 5, the first and second fuel cells may be formed by creating multiple channels within a single substrate.

For these two embodiments, it is best to review them in comparison to each other. In FIG. 4, the two fuel cell structures are formed adjacent each other by creating a sealant barrier 44 between the substrates 12 and 62. In FIG. 5, the same fuel cell structures are formed in a single substrate 12 with the sealant barrier formed in the sealant barrier channel 43. In both cases, sealant barrier 44 shown in both FIGS. 4 and 5, provide an electrically conductive, and gas impermeable connection between the two fuel cells.

This association of two fuel cells, either by the structure of FIG. 4 or the structure of FIG. 5, can be extended to place an arbitrary number of fuel cells in association with each other having the effect of producing a series electrical configuration. In both embodiments, the ends of the multiple structures are sealed with a sealant barrier 44 and a second sealant barrier 46. In both embodiments, negative electrical connection 48 is attached on one end of the multiple fuel cell assembly and positive electrical connection 50 is attached on the other end of the multiple fuel cell assembly to allow the multiple fuel cell assembly to drive an external electrical load.

The association of multiple fuel cells produces a fuel cell layer 64 having a fuel side 116 which is brought into association with a fuel plenum 10 and an oxidant side 118 which is brought into association with an oxidant plenum 16.

If the substrate material from which the fuel cells within the fuel cell layer is formed, then electrical current produced by the individual fuel cells is able to flow directly through the substrate material to create a bipolar fuel cell stack within the formed fuel cell layer. If the substrate material from which the fuel cells within the fuel cell layer is formed is not electrically conductive then the first coating 34 and second coating 36 should both be made of an electrically conducting material and formed so that first coating 34 is in electrical contact with the anode 40 while second coating 36 is in electrical contact with cathode 38. The first coating 34 is also made in electrical contact with the positive electrical connector 50 and the second coating 36 is made in electrical contact with the negative electrical connector 48. In either case, with a conductive or non-conductive substrate the electrical current produced by the fuel cell is able to be transported to the positive and negative electrical connections.

When multiple fuel cells are formed into a fuel cell layer, as described in FIGS. 4 and 5 a series electrical connection of the individual fuel cells results. The sealant barrier 44 is made of a conductive material. When the substrate material is conductive, a series connection of the individual fuel cells results, with the summed voltages of the multiple fuel cells producing a potential difference between the positive and negative electrical connections at either end of the fuel cell layer. When non-conductive substrates are used the first and second coatings, previously described, are made to be in electrical contact with each other by connecting the top and bottom of the conductive sealant barrier 44. In either case, with conductive or non-conductive substrate material, a series electrical connection of each of the fuel cells in the fuel cell layer is achieved without the need to clamp distinct components together. Also, the direction of current flow in the fuel cell layer is overall in the plane of the fuel cell layer rather than being orthogonal to the fuel cell layer as is the case in most current designs.

Figure 6:
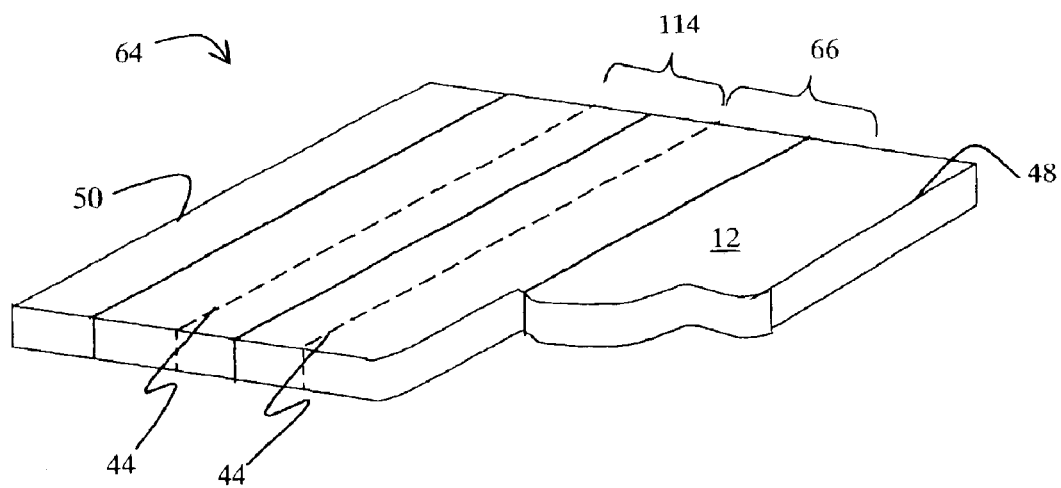
FIG. 6 is a perspective view of a fuel cell layer containing multiple fuel cells.

FIG. 6 is a perspective view of a fuel cell layer. In this Figure, a channel 14 is formed in a porous substrate 12 as per the description of FIG. 1. Sealant barriers 44 separate the undulating channel 14 and a second undulating channel 58. The structure is repeated to seal against a third undulating channel 60. Fuel cell layers manufactured using this invention can continue the structure with sealant barrier to form as many fuel cells as desired within a single layer. The determination of the spacing between individual fuel cells within the fuel cell layer is at the discretion of the designer, limited by pragmatic issues of manufacturability and mass transport issues within the porous substrate.

The overall structure of the fuel cell layer 64 creates a series connection of the individual fuel cells 8. Positive electrical connection 50 and negative electrical connection 48 allow an external load to be connected to the fuel cell layer, which produces a voltage which is a multiple of the single cell voltage to be produced within the fuel cell layer.

Figure 7:
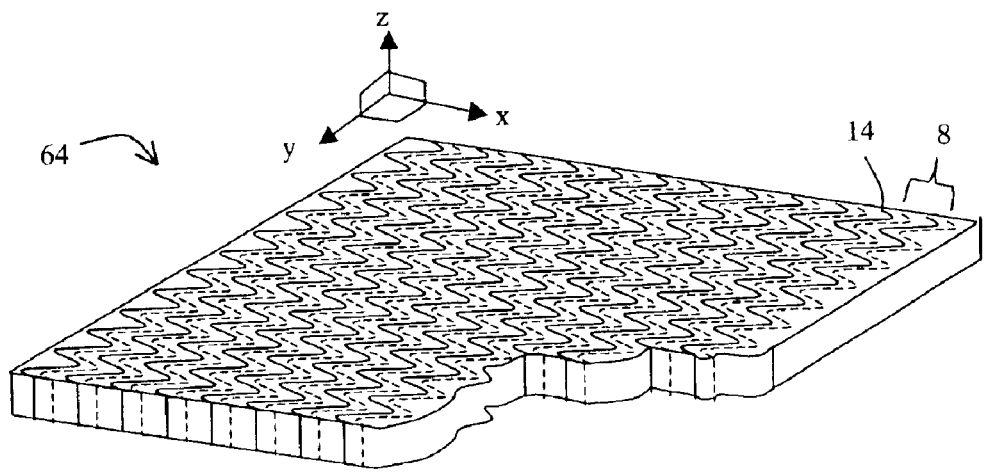
FIG. 7 is another detailed perspective fuel of the fuel cell of the invention with undulated, irregular channel.

FIG. 7 shows a similar view of the fuel cell layer 64 but in this Figure, having a channel with a less straight structure. FIG. 7 is essentially the same structure as shown in FIG. 1, but repeated multiple times creating a multi-cell structure.

Figure 8:
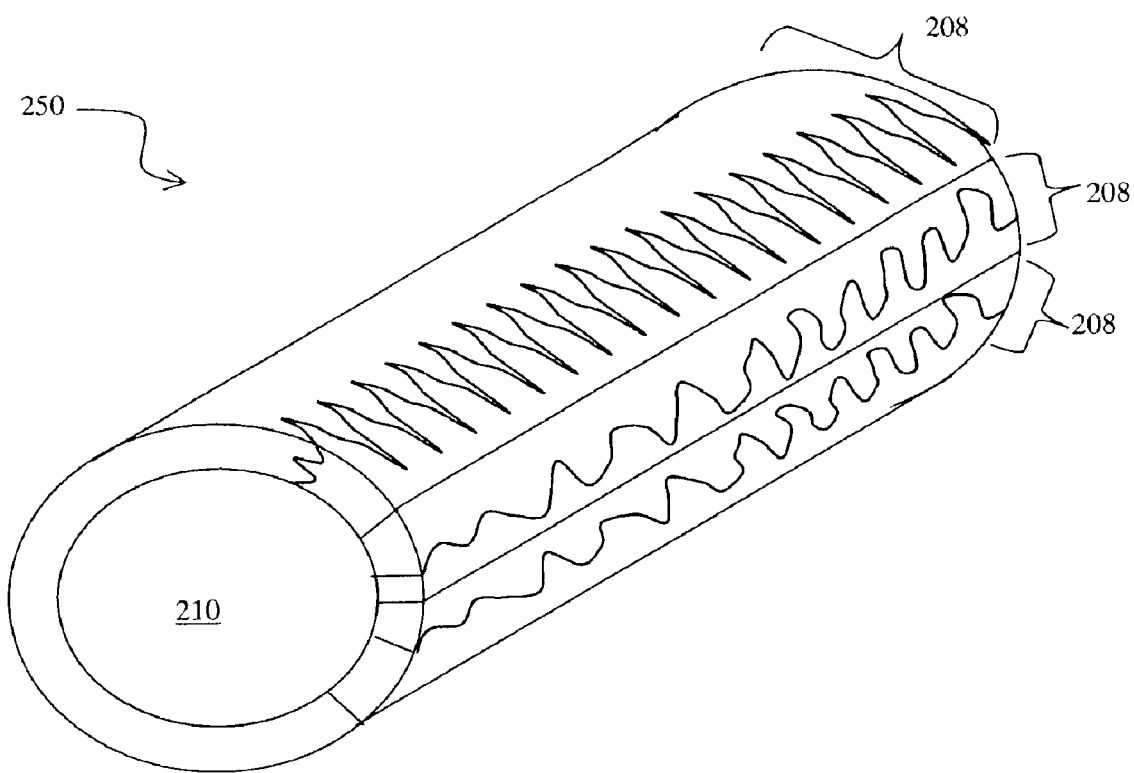
FIG. 8 is a perspective view of a cylindrical version of the fuel cell of FIG. 1.
Figure 8A:
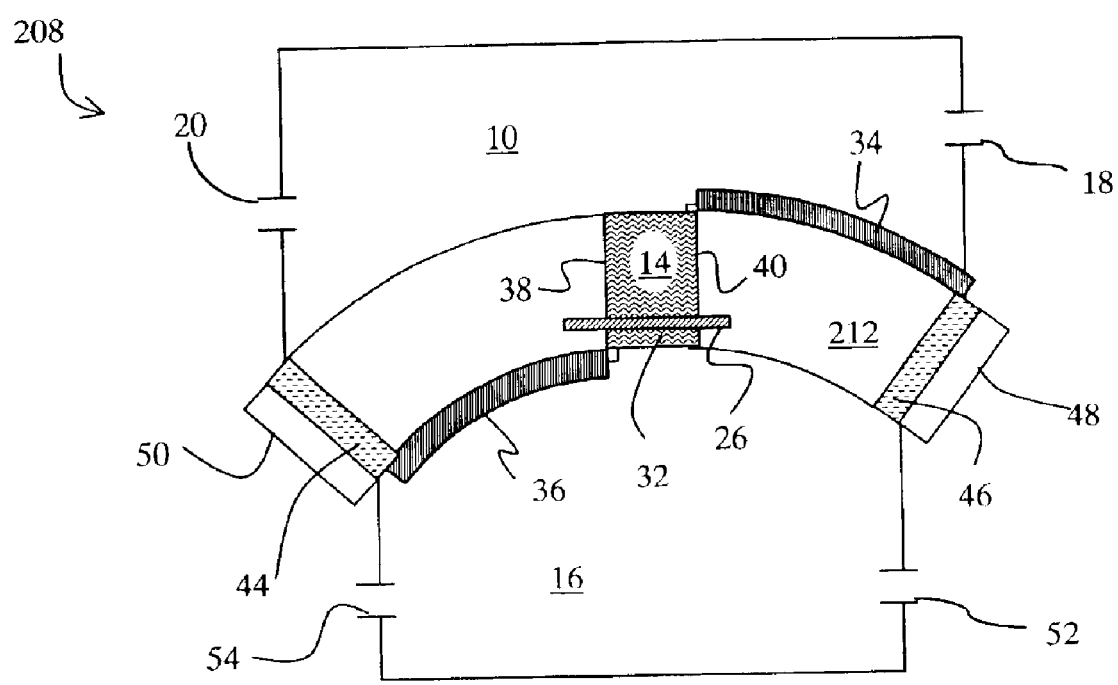

FIG. 8 is a perspective view of a cylindrical version or formed cylinder 56 of the fuel cell of FIG. 1. In this FIG. 8, the fuel plenum 10 is interior to the porous substrate 12, and the overall fuel cell 8 is in the shape of a cylinder. In this embodiment, the porous substrate has an undulating channel 14, and a second undulating channel 58 and a third undulating channel 60.

Figure 9:
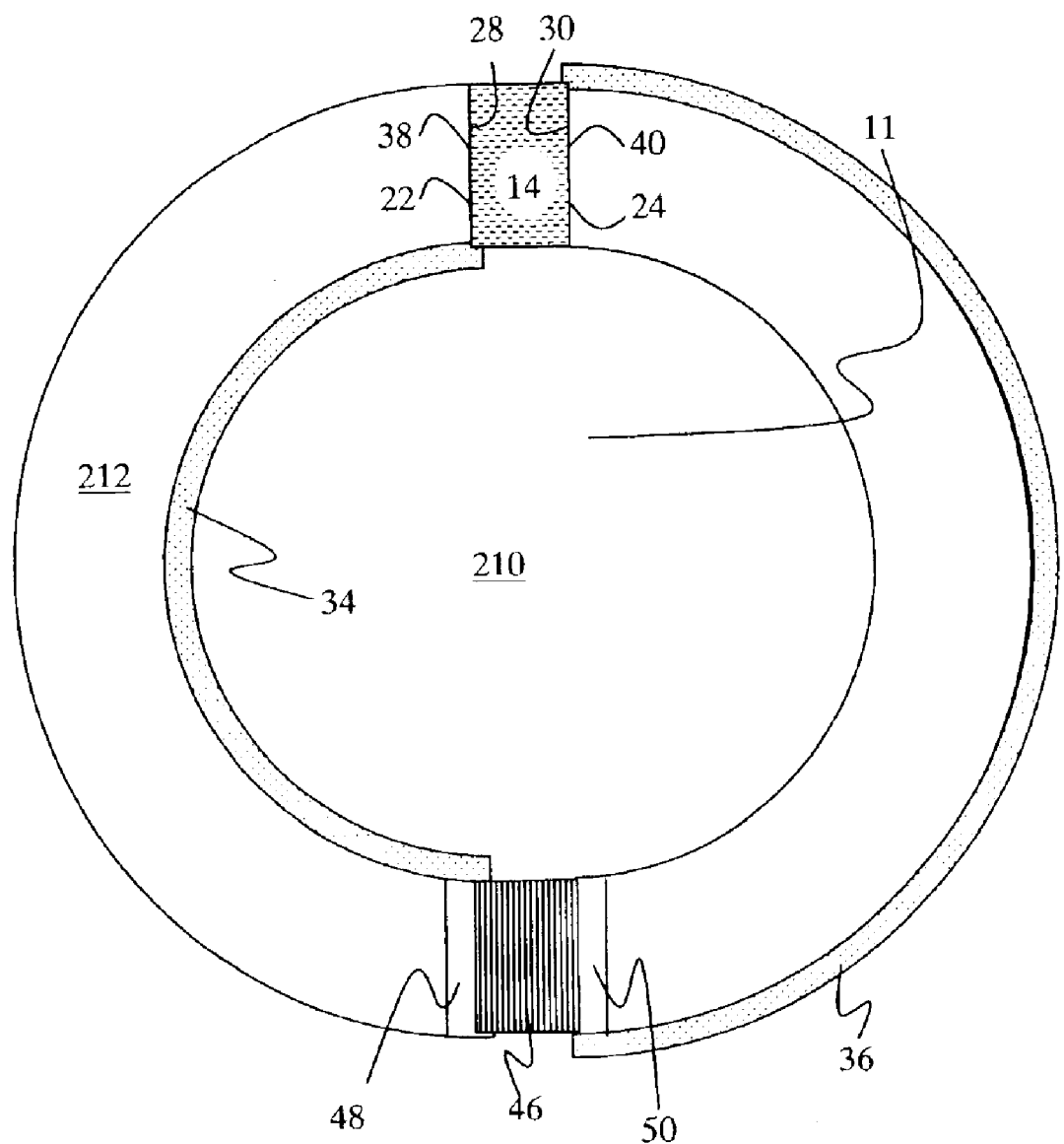
FIG. 9 is a cross-sectional view of the embodiment of the fuel cell of FIG. 8.

FIG. 9 is a cross section of the cylindrical version of the fuel cell of FIG. 8. In this cross section, the porous substrate 12 can have a first coating 34 with an undulating channel 14 and a first channel wall 22 and a second channel wall 24. The anode 28 is shown formed from the first catalyst layer 38. The support member 26 separates the first channel wall 22 from the second channel wall 24. The cathode 30 is made from a second catalyst layer 40. The fuel plenum 10 with fuel molecules 11 is shown on the interior side of the formed cylinder 56. The negative electrical connector 48 is shown adjacent sealant barrier 44. The positive electrical connector 50 is shown adjacent sealant barrier 44. A second coating 36 is shown disposed on the porous substrate 12, on the outside of the cylinder.

Figure 10:
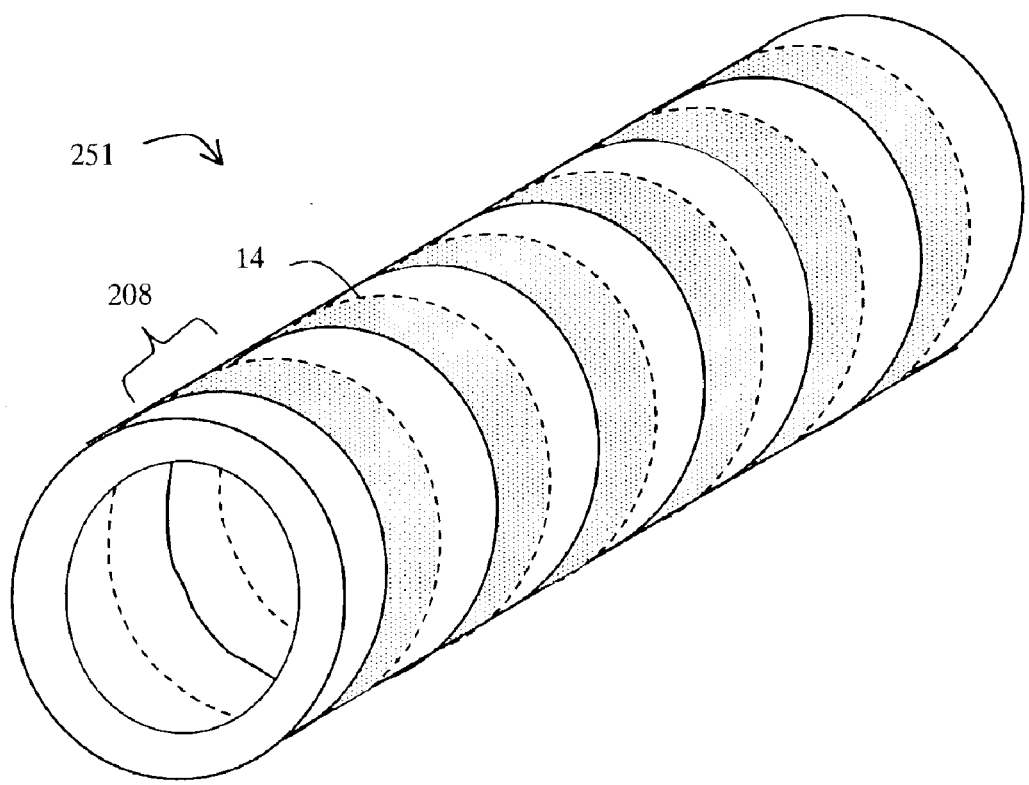
FIG. 10 is another embodiment of the inventive fuel cell of FIG. 8 with the channels in the form of a set of stacked annular rings.

FIG. 10 is another embodiment of the formed cylinder 56 having undulating channel 14 disposed radially and orthogonal to the axis of the cylinder 56.

Figure 11:
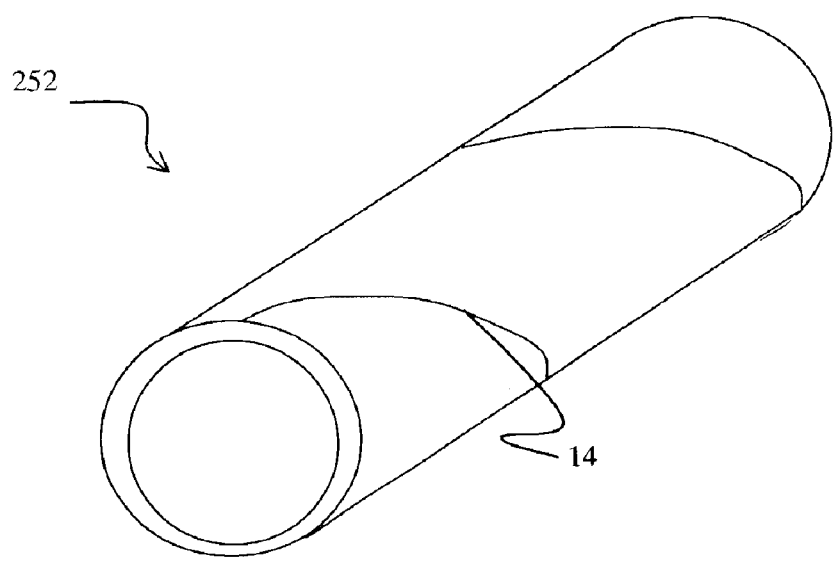
FIG. 11 is another embodiment of the inventive fuel cell of FIG. 8 with the channels in the form of a spiral around the cylinder.

FIG. 11 is another embodiment of the formed cylinder 56 having undulating channel 14 disposed in a wound or spiral fashion around the perimeter of the cylinder 56.

Figure 12:
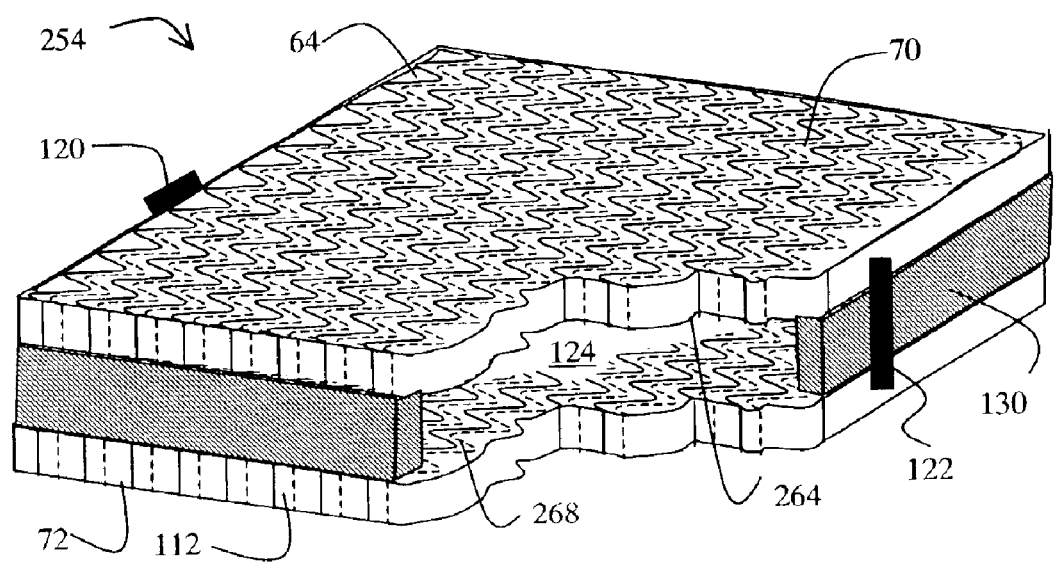
FIG. 12 is another embodiment of a fuel cell sandwich with a plurality of fuel cell layers.

FIG. 12 is a cutaway perspective view of an embodiment of a fuel cell sandwich with two fuel cell layers, a first fuel cell layer 64 and a second fuel cell layer 112 organized so that the hydrogen side 116 of the two fuel cell layers are facing each other.

In this Figure, the two fuel cell layers are sealed with seal 130 so that the fuel plenum 11) is formed by the two fuel cell layers and the perimeter seal. The two positive electrical connectors are connected to positive connector 120 and the two negative electrical connectors are connected to negative connector 122 so that the two layered fuel cell assemblies are now connected in an electrically parallel configuration. The resulting assembly is fuel cell sandwich 66 having a sandwich top 70 and a sandwich bottom 72, the sandwich top and sandwich bottom are the oxidant sides of the respective fuel cell layers. The resulting assembly is an enclosed plenum air breathing fuel cell that achieves a series of electrical connections of the individual fuel cells in each fuel cell layer and a parallel electrical connection of the two fuel cell layers. Only fuel is required to be fed to the interior of the sandwich structure and electrical current flows within the two fuel cell layers independently of one another. There is no electrical connection between the two fuel cell layers except at the parallel connection of the positive and negative electrical connections at either end of the fuel cell layers in the sandwich.

In yet another embodiment, the porous substrate can be utilized in a one plane, and have a rectangular, square or orthogonal shape, or alternatively, it can be undulating and irregularly shaped. The channels formed in the porous substrate can be of arbitrary shape. A preferred embodiment includes a plurality of thin channels that run parallel to each other and follow an irregular path that folds back on itself in a manner suggestive of a fractal pattern. A preferred embodiment contemplates that the substrate is formed in the shape of a cylinder and the undulating channel is utilized in the center of the cylinder, along the longitudinal axis of the cylinder, such that the undulating channel is generally parallel to the axis of the cylinder. More than one undulating channel can be used with the substrate. The voltage of the resulting fuel cell can be increased by using more undulating channels. These channels can be created in parallel relationship with each other and can be placed in the center of the cylinder, in the center of the substrate, if the substrate has another geographical shape, or placed around the circumference of substrate, such as the circumference of the cylinder. Alternatively, the undulating channels may be formed so that they are radially disposed around the axis of the substrate or cylinder. In yet another embodiment, the undulating channels can be formed so that they are in a spiral configuration around the circumference of the substrate.

Although various materials could be used for the porous substrate, one usable material could be a conductive material. Materials such as metal foams, graphites, graphite composites, one ore more silicon wafers, sintered polytetrafluoro ethylene, pellets of polymer, reinforced phenolic resins, recycled organic material, such as smashed up bit of coconut and various combinations of these materials are contemplated as usable in this invention.

The undulating channel is contemplated to have at least one, but potentially, up to 50 support members separating the walls of the undulating channel. The support members can be located at the extreme ends of the channel, such as forming a top or bottom, or can be located in the middle portion of the channel, or be oriented at an angle to the center of the undulating channel. It is contemplated that the support member can be an insulating material. If an insulating material is used, it is contemplated that silicon, graphite composite, polytetra fluoroethylene, polymethamethacrylate, polymers, copolymers, cross-linked polymers, wood, bits of coconut and combinations thereof can be usable.

Dimensionally, the undulating channel can have a dimension ranging from 1 micron to 10 cm high, 1 nanometer to 1 mm wide and from 1 nanometer to 100 meters in length.

Between 1 and 5000 undulating channels are contemplated as usable in this design, however in a preferred embodiment, the fuel cell has 75 undulating channels. This fuel cell is contemplated to be capable of producing a voltage between 0.25 volts and 2500 volts, and more preferably between 30 and 60 volts.

In yet another embodiment of the invention, it is contemplated that the electrolyte can be mounted in the channel at an angle, preferable at an angle, which is perpendicular to the longitudinal or horizontal axis of the predominant portion of the porous substrate.

The design of the invention has in an alternative embodiment, either a dead end version of the fuel cell or a continuous flow version of the fuel cell having a fuel plenum outlet. If a dead end version of the fuel cell is not used, then an additional oxidant plenum inlet and/or an additional oxidant plenum outlet could be used. More than one inlet and outlet are contemplated as usable.

The invention can be constructed such that the fuel plenum contains a mixture of, or pure hydrogen gas. It is preferred that the hydrogen gas be at least 90% hydrogen. Alternatively, the fuel plenum could use an aqueous solution containing methanol, or possibly formic acid, an aqueous solution of ammonia, sodium borohydride or combinations of these.

The fuel of the fuel plenum can be contained in a permeable material contained within the fuel plenum. Alternatively, the fuel plenum can be made of a solid material with a flow field. The fuel plenum can be a closed plenum or alternatively, open to the ambient air and be usable in the invention. The fuel plenum and the oxidant plenum can each have a variety of shapes, round, elliptoid, rectangular or square. It is particularly contemplated that the fuel plenum has a rectangular cross section.

The anode and the cathode of the invention can be created using first a catalyst layer and forming them on the first channel wall and second channel walls, or alternatively, the anode and cathode can be created or separately manufactured and then inserted, or embedded in the channel walls. The preferred embodiment contemplated using the anode in or on the first channel wall and the cathode in or on the second channel wall.

Electrolyte usable in this invention can be a gel, a liquid or a solid material. Various materials are contemplated as usable and include: a perfluoronated polymer containing sulphonic groups, an aqueous acidic solution having a ph of at least 7 or similar aqueous acidic solutions, an aqueous alkaline solution having a ph of at most 4 or a similar alkaline solution.

The fuel cell is manufactured using a first and second coating on the porous substrate. These coatings can be the same material or different materials. The first or second coating can comprise a thin polymer coating, such as a coating of polytetrafluoroethylene, or polymethyl methacrylate, however, other polymers are contemplated as usable such as polyethylene, polypropylene, polybutylene, and copolymer thereof, cross-linked polymers thereof, as well as various conductive metals.

The first and second catalyst layers that are contemplated as usable in the invention can be a noble metals, alloys having some noble metals in them, ruthenium, alloys of ruthenium, and combinations of these materials. It is contemplated that ternary alloys having at least one noble metal are usable for good voltage creation. Platinum-ruthenium alloys are also contemplated as usable in this invention. The catalyst layers should each have a catalyst loading quantity wherein the amount of catalyst is different for each layer.

One method for making the fuel cell layer contemplates the following steps:
1. forming a porous substrate having a top and bottom having a first side and a second side;
2. forming one or more sealant barrier channel(s) in the porous substrate;
3. filling the sealant barrier channel(s) with sealant barrier;

4. coating the top with a first coating;
5. coating the bottom with a second coating;
6. forming one or more undulating channel(s) through the porous substrate, wherein the undulating channel(s) comprises a first channel wall and a second channel wall creating at least one formed channel;
7. forming one or more support member in each of the formed channels;
8. depositing catalyst into the first channel wall of each channel forming a cathode;
9. depositing catalyst into the second channel wall of each channel forming an anode;
10. filling each of the formed channel(s) with electrolyte;
11. attaching a positive electrical connection on one end to the first side of the porous substrate, and attaching a negative electrical connection on one end to the second side of said porous substrate for creating a current from the fuel cell to an outside source and from the outside source to the porous substrate;
12. attaching the fuel plenum to the porous substrate;
13. attaching the oxidant plenum to the porous substrate;
14. loading the fuel plenum with fuel and the oxidant plenum with oxidant.

The method can be supplemented using the additional step of forming between one and a great number of sealant barrier channels and electrolyte channels in the porous substrate, such as at up to 75 channels, but even more are contemplated as usable herein.

In this method the undulating channel can be formed by molding, pressure laminating, or by embossing, etching or even simply saw cutting the porous substrate. If etching is the step utilized in the method, it is contemplated that the etching can be performed by laser etching, deep reactive ion etching, or alkaline etching. In a preferred embodiment, it is preferred to form support member 26 outside of channel 14 so long as it connects the two sides of the substrate.

The variations for making the apparatus can be implemented into the method, for example the method can contemplate using a conductive material for the sealant barrier and/or an insulation material for the support member.

The method of the invention can further comprising the step of sealing the plenum outlets and inlets after the fuel and oxidant is loaded into their respective plenums creating a dead ended fuel cell.

The method can further include in the step of using an electrolyte, using an electrolyte selected from the group: a perfluoronated polymer containing sulphonic groups, an aqueous acidic solution having a ph of at least 7, an aqueous alkaline solution having a ph of at most 4. Additionally, it is contemplated that the electrolyte layer can be between 100 nanometers and 0.5 mm in thickness, or alternatively simply filling each undulating channel from first wall to second wall without a gap.

The method contemplates making anodes and cathodes using layers of catalyst, on the walls of the undulating channels on the porous membrane, wherein the layers of catalyst range between 1 nanometer and 100 microns in thickness.

The invention also contemplates a method for making a multi-layer fuel cell comprising the steps:
1. forming a porous substrate having a top and bottom having a first side and a second side;
2. forming a sealant barrier channel in the first side and the second side;
3. filling the sealant barrier channel with sealant barrier;
4. coating the top with a first coating;
5. coating the bottom with a second coating;
6. forming an undulating channel through the porous substrate, wherein the undulating channel comprises a first channel wall and a second channel wall thereby creating a formed channel having a longitudinal axis;
7. forming a support member in the formed channel;
8. depositing catalyst into the first channel wall forming a cathode;
9. depositing catalyst into the second channel wall forming an anode;
10. filling the formed channel with electrolyte;
11. repeating steps 1 through 10 forming a plurality of substrates each containing a fuel cell;
12. placing the plurality of substrates in intimate physical and electrical contact with each other by connecting the sealant barriers of neighboring substrates and forming a composite fuel cell layer.

Yet another method for making a fuel is contemplated which has the steps of:
1. forming a first porous substrate;
2. depositing a layer of catalyst onto the porous substrate;
3. depositing a layer of electrolyte on the layer of catalyst forming a first laminate;
4. forming a second porous substrate;
5. depositing a layer of catalyst onto the second porous substrate forming a second laminate;
6. placing the first laminate over the second laminate such that the catalyst layer and the electrolyte layer contact each other;
7. placing a sealant barrier on the second laminate on the side without catalyst;
8. depositing a third porous substrate on the sealant barrier forming a first fuel cell laminate;
9. repeating the steps 1 through 8 forming a second fuel cell laminate;
10. assembling the first fuel cell laminate on top of the second fuel cell laminate forming an assembled laminate;
11. repeating the steps for forming a plurality of fuel cell laminates, and assembling the additional fuel cell laminates on top of the assembled laminate forming a fuel cell composite having a top fuel cell laminate;
12. cutting the fuel cell composite into a plurality of fuel cell layers each having a top and a bottom;
13. depositing a first coating on the top and a second coating on the bottom;
14. attaching a negative electrical connection on one end of the fuel cell layer and to an external load on the other end;
15. attaching a positive electrical connection on one end of the fuel cell layer and to an external load on the other end;
16. attaching a fuel plenum to the top of the fuel cell layer; and
17. attaching an oxidant plenum to the bottom of the fuel cell layer.

The fuel cell of the invention can be used by first, connecting a fuel source to a fuel plenum inlet; second, connecting a fuel plenum outlet to a re-circulating controller; third, connecting an oxidant plenum inlet to an oxidant source; fourth, connecting an oxidant plenum outlet to a flow control system, fifth, connecting a positive electrical connection and a negative electrical connection to an external load; sixth, flowing fuel and oxidant to the inlets; and finally, driving load with electricity produced by the fuel cell.

It is contemplated that the fuel cell can be used in a system comprising:(a)a fuel cell having at least one planar surface wherein said planar surface is used to form a circuit with an electronic component mounted on said microstructure fuel cell This system contemplates that the electronic component is a cellular phone, or it could be any one of the following:

a PDA, a satellite phone, a laptop computer, portable DVD, portable CD player, portable personal care electronics, portable boom boxes, portable televisions, radar, radio transmitters, radar detectors, and combinations thereof.

The invention can relate to a phone system having the novel fuel cell wherein the fuel cell has a planar surface, a circuit formed on the planar surface; and a telephone communicating with the surface to receive current from the fuel cell. The telephone can be a cellular phone or a satellite phone.

The invention has been described in detail with particular reference to certain preferred embodiments thereof, but it will be understood that variations and modifications can be effected within the scope of the invention.

What is claimed is:

1. An electrochemical cell for the separation of hydrogen and oxygen from water comprising:
   a. a first plenum containing a fuel inlet for filling said first plenum with fuel;
   b. a second plenum containing oxidant;
   c. a porous substrate communicating with said first plenum, and said second plenum further comprising a top, a bottom, a first side and a second side;
   d. an undulating channel formed in said porous substrate having a first channel wall and a second channel wall;
   e. a support member disposed between said first channel wall and said second channel wall;
   f. an anode formed from a first catalyst layer disposed on said first channel wall;
   g. a cathode formed from a second catalyst layer disposed on said second channel wall;
   h. electrolyte disposed in said undulating channel contacting the anode and the cathode forming a barrier preventing transfer of fuel to the cathode and preventing transfer of oxidant to the anode;
   i. a first coating disposed on at least a portion of said porous substrate to prevent fuel from entering said porous substrate;
   j. a second coating disposed on at least a portion of said porous substrate for preventing oxidant from entering said porous substrate;
   k. wherein said first plenum and said second plenum are separated by the porous substrate and the electrolyte, such that fuel and oxidant are blocked from said anode and said cathode by the electrolyte;
   l. a sealant barrier disposed on said porous substrate between said first plenum and said second plenum opposite said anode and said cathode; and
   m. a negative electrical connection disposed on said second side of said porous substrate for flowing current from said electrochemical cell to an outside source and a positive electrical connection disposed on said first side of said porous substrate for flowing current from said outside source to said porous substrate.

2. The electrochemical cell of claim 1, wherein said porous substrate is formed in the shape of a cylinder and said undulating channel is disposed parallel to the axis of said formed cylinder.

3. The electrochemical cell of claim 2, wherein the separation ability of the electrochemical cell is increased by adding a plurality of undulating channels in parallel relation to each other around the circumference of said formed cylinder.

4. The electrochemical cell of claim 1, wherein said porous substrate is formed in the shape of a cylinder and said undulating channel is disposed radially around said axis of said formed cylinder.

5. The electrochemical cell of claim 4, further having a plurality of undulating channels in parallel relationship to each other.

6. The electrochemical cell of claim 1, wherein said porous substrate is formed in the shape of a cylinder and said undulating channel is disposed in a spiral configuration around the circumference of said formed cylinder.

7. The electrochemical cell of claim 1, wherein said porous substrate is a conductive material.

8. The electrochemical cell of claim 1, wherein said porous substrate comprises a member of the group consisting of a metal foam, graphite, graphite composite, silicon wafer, sintered polytetrafluoro ethylene, pellets of polymer, reinforced phenolic resin, recycled organic material and combinations thereof.

9. The electrochemical cell of claim 1, wherein said support member is an insulating material.

10. The electrochemical cell of claim 9, wherein said insulating material comprises a member of the group consisting of silicon, graphite composite, polytetra fluoroethylene, polymethamethacrylate, polymers, copolymers, cross-linked polymers, wood, and combinations thereof.

11. The electrochemical cell of claim 1, further comprising a first plenum outlet.

12. The electrochemical cell of claim 1, further comprising a second plenum inlet.

13. The electrochemical cell of claim 1, further comprising a second plenum outlet.

14. The electrochemical cell of claim 1, wherein said first plenum comprises a hydrogen gas.

15. The electrochemical cell of claim 14, wherein said hydrogen gas is at least 90% hydrogen.

16. The electrochemical cell of claim 1, wherein said first plenum comprises a permeable material.

17. The electrochemical cell of claim 1, wherein said first plenum further comprises an outlet.

18. The electrochemical cell of claim 1, wherein said anode is embedded in said first channel wall.

19. The electrochemical cell of claim 1, wherein said cathode is embedded in said second channel wall.

20. The electrochemical cell of claim 1, wherein said electrolyte is a member of the group consisting of a perfluoronated polymer containing sulphonic groups, an aqueous acidic solution having a ph of at least 7, and an aqueous alkaline solution having a ph of at most 4.

21. The electrochemical cell of claim 1, wherein said first coating and said second coating are the same material.

22. The electrochemical cell of claim 1, wherein said first coating and said second coating are different material.

23. The electrochemical cell of claim 1, wherein said first and second coating can comprise a member of the group consisting of polymer coating poly tetrafluoro ethylene, polymethyl methacrylate, polyethylene, polypropylene, polybutylene, and copolymer thereof, cross-linked polymers thereof, conductive metal.

24. The electrochemical cell of claim 1, wherein said first catalyst layer and said second catalyst layers are members of the group consisting of noble metals, alloys comprising noble metals, platinum, platinum alloys, ruthenium, alloys of ruthenium, and combinations thereof.

25. The electrochemical cell of claim 24, wherein said first and second catalyst layers are ternary alloys comprising at least one noble metal.

26. The electrochemical cell of claim 24, wherein said first and second catalyst layers are a ruthenium—ruthenium alloy.

27. The electrochemical cell of claim 24, wherein said first catalyst layer and second catalyst layer each has catalyst loading quantity wherein the amount of catalyst is different for each layer.

28. The electrochemical cell of claim 1, wherein said undulating channel is in at least two planes.

29. The electrochemical cell of claim 1 wherein said undulating channel has dimension of a height ranging from 1 microns to 10 cm, a width ranging from 1 nanometer to 1 mm, and a length ranging from 1 nanometer to 100 meters.

30. The electrochemical cell of claim 1, having between 1 undulating channel and 5000 undulating channels.

31. The electrochemical cell of claim 30, having 75 undulating channels.

32. The electrochemical cell of claim 1, wherein said first plenum has a rectangular cross section.

33. The electrochemical cell of claim 1, wherein said first plenum has an annular cross section.

34. The electrochemical cell of claim 1, wherein said porous substrate communicating with said first plenum further comprises a horizontal axis, and said electrolyte disposed in said channel is oriented at an angle perpendicular to said horizontal axis.

* * * * *